(12) United States Patent
Yang

(10) Patent No.: US 10,194,200 B2
(45) Date of Patent: Jan. 29, 2019

(54) AUDIO DATA PROCESSING METHOD AND TERMINAL

(71) Applicant: Tencent Technology (Shenzhen) Company Limited, Shenzhen (CN)

(72) Inventor: Jiang Yang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/951,078

(22) Filed: Apr. 11, 2018

(65) Prior Publication Data

US 2018/0234721 A1 Aug. 16, 2018

Related U.S. Application Data

(63) Continuation-in-part of application No. PCT/CN2017/070692, filed on Jan. 10, 2017.

(30) Foreign Application Priority Data

Jan. 14, 2016 (CN) .......................... 2016 1 0025708

(51) Int. Cl.
*H04N 21/439* (2011.01)
*G10L 13/02* (2013.01)
*G10K 11/16* (2006.01)

(52) U.S. Cl.
CPC ........... *H04N 21/439* (2013.01); *G10K 11/16* (2013.01); *G10L 13/02* (2013.01)

(58) Field of Classification Search
CPC ....... H04N 21/439; G10K 11/16; G10L 13/02
See application file for complete search history.

(56) References Cited

U.S. PATENT DOCUMENTS 9,043,201 B2* 5/2015 Mittal ................ G10L 19/0212
704/201
2004/0098257 A1* 5/2004 Katsuya .............. G10L 19/005
704/226

(Continued)

FOREIGN PATENT DOCUMENTS

CN 101425291 A 5/2009
CN 101640053 A 2/2010

(Continued)

OTHER PUBLICATIONS

Tencent Technology, ISR, PCT/CN2017/070692, dated Apr. 12, 2017, 2 pgs.

*Primary Examiner* — Nafiz E Hoque
(74) *Attorney, Agent, or Firm* — Morgan, Lewis & Bockius LLP

(57) ABSTRACT

A method for removing transitional noise in an audio data stream is performed by a computing device. After obtaining first and second audio frames in a time sequence of the audio data stream, the computing device determines a frame segmentation position in the audio frames based on predefined closeness criteria that require a predefined distance between the sampling point values at the frame segmentation position in the first and second audio frames to satisfy a predefined closeness condition. Next, the computing device obtains respective sampling point values preceding the frame segmentation position in the second audio frame and ones following the frame segmentation position in the first audio frame. The computing device then sequentially stitches the respective sampling point values obtained from the first and second audio frame to generate a third audio frame and inserts the third audio frame between the first audio frame and the second audio frame.

20 Claims, 7 Drawing Sheets

(56) References Cited

U.S. PATENT DOCUMENTS

| | | |
|---|---|---|
| 2006/0085197 A1 | 4/2006 | Kayama et al. |
| 2009/0048827 A1* | 2/2009 | Kumar .................. G10L 19/005 |
| | | 704/205 |
| 2012/0236584 A1 | 9/2012 | Ueno et al. |

FOREIGN PATENT DOCUMENTS

| | | |
|---|---|---|
| CN | 101789240 A | 7/2010 |
| CN | 103905843 A | 7/2014 |

* cited by examiner

AUDIO DATA PROCESSING METHOD AND TERMINAL

PRIORITY CLAIM AND RELATED APPLICATIONS

This application is a continuation-in-part application of PCT/CN2017/070692, entitled "AUDIO DATA PROCESSING METHOD AND TERMINAL" filed on Jan. 10, 2017, which claims priority to Chinese Patent Application No. 201610025708.1, filed with the State Intellectual Property Office of the People's Republic of China on Jan. 14, 2016, and entitled "AUDIO DATA PROCESSING METHOD AND TERMINAL", both of which are incorporated herein by reference in their entirety.

FIELD OF THE TECHNOLOGY

This application relates to the field of audio data processing technologies, and in particular, to an audio data processing method and terminal.

BACKGROUND OF THE DISCLOSURE

Due to the application of audio data processing technologies, sounds can be collected by using an audio monitoring unit by people, to generate audio data and store the data. The stored audio data may be played by using an audio player when necessary, thereby re-showing the sounds. The wide application of audio data processing technologies makes it very easy to record and re-show sounds, thereby playing a vital role in people's life and work.

Currently, when processing an audio data stream, one frame of audio data needs to be inserted between two adjacent frames of audio data. For example, in some special sound effects, one frame of audio data is inserted between two adjacent frames of audio data in an audio data stream of either a left channel or a right channel, so that there is a difference of one frame of audio data between the audio data stream of the left channel and the audio data stream of the right channel, thereby achieving the special effect of Surround sound. For another example, when the audio data stream of the left channel and the audio data stream of the right channel are asynchronous, audio data may be inserted into one of the audio data streams to resolve the problem of the asynchronous audio data streams of the left channel and the right channel.

However, currently, when inserting audio data between two adjacent frames of audio data in an audio data stream, the inserted audio data is usually directly one the two frames of audio data, leading to that there is apparent noise where the audio data is inserted during audio play after the insertion. This is a problem needing to be resolved. Similarly, there is noise when one frame of audio data is deleted from the audio data stream.

SUMMARY

According to embodiments of this application, an audio data processing method and terminal is provided.

In accordance with some embodiments of the present application, an audio data processing method is performed by a computing device. The computing device obtains a first audio frame and a second audio frame adjacent to each other from an audio data stream, the first audio frame preceding the second audio frame in time sequence. The computing device then determines a frame segmentation position when a predefined distance between a sampling point value at the frame segmentation position in the first audio frame and a sampling point value at the frame segmentation position in the second audio frame satisfies a predefined closeness condition. Next the computing device obtains sampling point values preceding the frame segmentation position in the second audio frame and sampling point values following the frame segmentation position in the first audio frame. Finally, the computing device sequentially stitches the sampling point values associated with the first and second audio frames to generate a third audio frame and inserts the third audio frame between the first audio frame and the second audio frame.

In accordance with some embodiments of the present application, an audio data processing method is performed by a computing device. The computing device obtains a first audio frame and a second audio frame adjacent to each other from an audio data stream, the first audio frame preceding the second audio frame in time sequence. The computing device then determines a frame segmentation position when a predefined distance between a sampling point value at the frame segmentation position in the first audio frame and a sampling point value at the frame segmentation position in the second audio frame satisfies a predefined closeness condition. Finally, the computing device obtains sampling point values preceding the frame segmentation position in the first audio frame and sampling point values following the frame segmentation position in the second audio frame and sequentially stitches them to generate a fourth audio frame and replaces the first audio frame and the second audio frame with the fourth audio frame.

In accordance with some embodiments of the present application, a computing device includes memory, a processor, and computer readable instructions stored in the memory. The computer readable instructions, when executed by the processor, cause the processor to perform the following steps: obtaining a first audio frame and a second audio frame adjacent to each other from an audio data stream, the first audio frame preceding the second audio frame in time sequence; determining a frame segmentation position, where a predefined distance between a sampling point value at the frame segmentation position in the first audio frame and a sampling point value at the frame segmentation position in the second audio frame satisfies a predefined closeness condition; and obtaining sampling point values preceding the frame segmentation position in the second audio frame and sampling point values following the frame segmentation position in the first audio frame and sequentially stitching the sampling point values, to generate a third audio frame, and inserting the third audio frame between the first audio frame and the second audio frame.

In accordance with some embodiments of the present application, a computing device includes memory, a processor, and computer readable instructions stored in the memory. The computer readable instructions, when executed by the processor, cause the processor to perform the following steps: obtaining a first audio frame and a second audio frame adjacent to each other from an audio data stream, the first audio frame preceding the second audio frame in time sequence; determining a frame segmentation position, where a predefined distance between a sampling point value at the frame segmentation position in the first audio frame and a sampling point value at the frame segmentation position in the second audio frame satisfies a predefined closeness condition; and obtaining sampling point values preceding the frame segmentation position in the first audio frame and sampling point values following the frame segmentation position in the second audio frame and sequentially stitching the sampling point values, to generate a fourth audio frame, and replacing the first audio frame and the second audio frame with the fourth audio frame.

Details of one or more embodiments of this application are shown in the following accompanying drawings and descriptions. Other features, objectives and advantages of this application will be apparent according to the specification, accompanying drawings and claims.

BRIEF DESCRIPTION OF THE DRAWINGS

To describe the technical solutions of the embodiments of this application or the existing technology more clearly, the following briefly describes the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Figure 1:
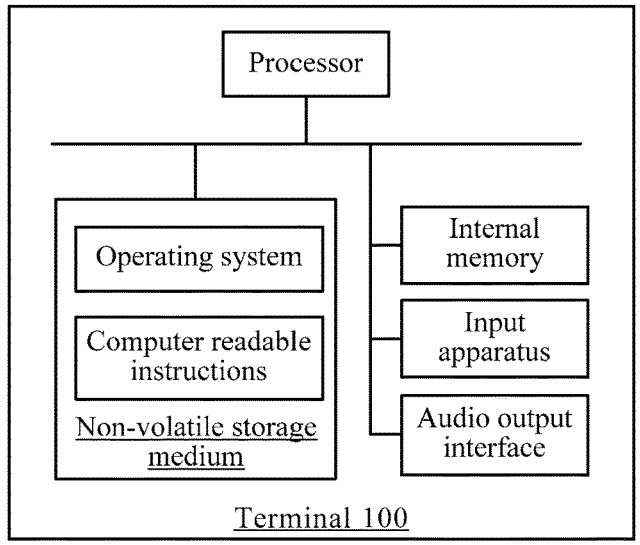
FIG. 1 is a schematic structural diagram of a terminal for implementing an audio data processing method according to an embodiment.

As shown in FIG. 1, in an embodiment, a computing device (e.g., the terminal 100) for implementing an audio data processing method is provided, including a processor, a non-volatile storage medium, an internal memory, an input apparatus and an audio output interface connected by using a system bus. The processor is capable of calculating and controlling working of the terminal 100. The processor is configured to perform an audio data processing method. The non-volatile and non-transitory storage medium includes at least one of a magnetic storage medium, an optical storage medium, or a flash storage medium. Computer readable instructions are stored in the non-volatile and non-transitory storage medium. The computer readable instructions, when executed by the processor, cause the processor to perform an audio data processing method. The input apparatus includes at least one of a physical button, a rack ball, a touchpad, a physical interface used for connecting an external control device, a voice activated interface, or a touch layer overlapping with a display screen. The external control device may be, for example, a mouse, a multimedia wire-controlled apparatus, or the like. The terminal 100 includes various electronic devices capable of processing audio data, such as a desktop computer, a portable notebook computer, a mobile phone, a music player, or a smartwatch.

Figure 2:
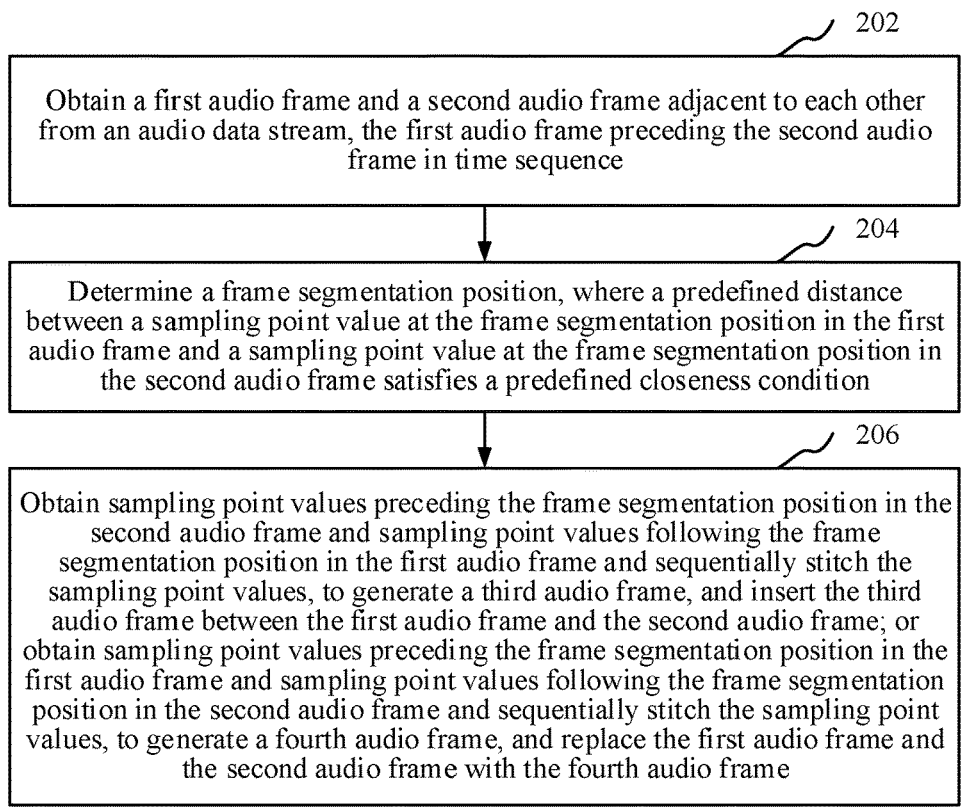
FIG. 2 is a schematic flowchart of an audio data processing method according to an embodiment.

As shown in FIG. 2, in an embodiment, an audio data processing method is provided. In this embodiment, an example is used for description in which the method is applied to the terminal 100 in FIG. 1. The method specifically includes the following steps:

Step 202: Obtain a first audio frame and a second audio frame adjacent to each other from an audio data stream, the first audio frame preceding the second audio frame in time sequence.

Specifically, the audio data stream includes a series of sampling point values having a time sequence. The sampling point values are obtained by sampling original analog sound signals according to a particular audio sampling rate. A series of sampling point values can describe a sound. The audio sampling rate refers to a quantity of sampling points collected within one second, with a unit being Hertz (Hz). A higher audio sampling rate indicates a higher acoustic frequency that can be described.

An audio frame includes sampling point values having a time sequence and a specific quantity. According to a coding format of an audio data stream, if there is an audio frame in the coding format, the audio frame specification may be directly used. If there is no audio frame specification but a series of sampling point values having a time sequence, an audio frame may be segmented from the series of sampling point values having a time sequence according to a preset frame length. The preset frame length refers to a preset quantity of sampling point values included in one audio frame.

The first audio frame and the second audio frame obtained from the audio data stream are adjacent, and the first audio frame precedes the second audio frame in the time sequence of the audio data stream. That is, when performing play processing on the audio data stream, the first audio frame is played before the second audio frame. The first audio frame and the second audio frame are two adjacent audio frames between which an audio frame needs to be inserted (e.g., to create a surround sound effect or adjust a timing delay in a respective sound channel).

Figure 3A:
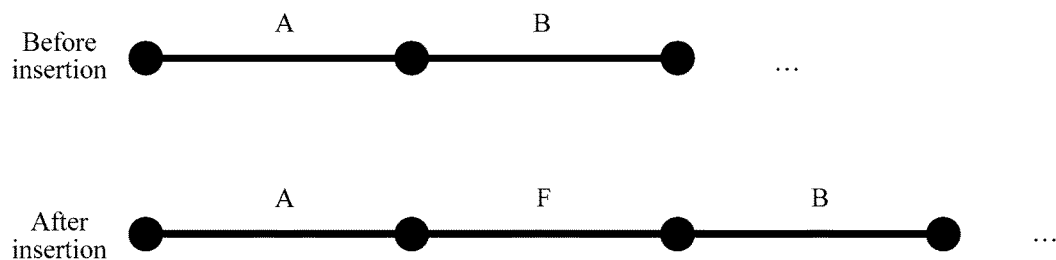
FIG. 3A is a schematic diagram of inserting an audio frame between a first audio frame and a second audio frame adjacent to each other according to an embodiment.
Figure 3B:
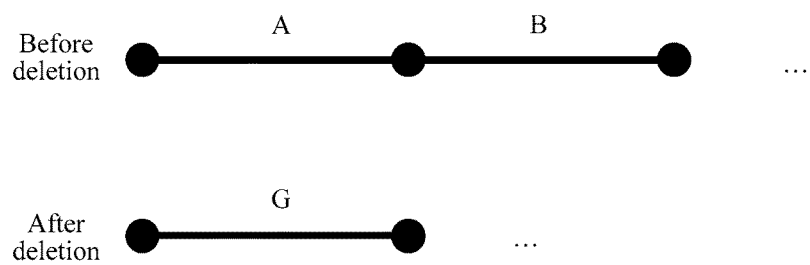
FIG. 3B is a schematic diagram of deleting one of a first audio frame and a second audio frame adjacent to each other according to an embodiment.

For example, referring to FIG. 3A, an audio data stream includes a first audio frame A, a second audio frame B, arranged according to a time sequence of the audio frames in the audio data stream. When an audio frame needs to be inserted, an audio frame F needs to be inserted between the first audio frame A and the second audio frame B. Referring to FIG. 3B, when an audio frame needs to be deleted, sampling point values of a respective one of the first audio frame A and the second audio frame B need to be deleted, to preserve one audio frame G. The following process determines the sample values of the audio frame F that is inserted, and the sample values of the audio frame G that is preserved, with the goal to have a smooth transition without introducing an audible transitional noise created during introduction of a discontinuity in the audio stream.

Step 204: Determine a frame segmentation position (e.g., a specific sample location in a sequence sample locations of an audio frame), where a predefined distance between a sampling point value at the frame segmentation position in the first audio frame and a sampling point value at the frame segmentation position in the second audio frame satisfies a predefined closeness condition.

Specifically, the frame segmentation position is a position where the first audio frame and the second audio frame are segmented, and is a position relative to an audio frame. A distance refers to an absolute value of a difference between two sampling point values that are at corresponding sampling positions in two audio frames. For example, referring to a partial distribution diagram shown in FIG. 4 of sampling point values of a first audio frame A along a sequence of x sampling positions of the first audio frame A and a partial distribution diagram shown in FIG. 5 of sampling point values of a second audio frame B along a sequence of x sampling positions of the second audio frame B. For each of the sequence of x sample positions in an audio frame, an absolute value of a difference between the first sampling point value of the first audio frame A and the first sampling point value of the second audio frame B is a distance between the first sampling point value of the first audio frame A and the first sampling point value of the second audio frame B at that sample position in the two audio frames.

The predefined closeness condition is a quantitative condition used for determining whether a distance between two sampling point values is sufficient small. In an embodiment, the closeness condition may be that a distance is equal to 0, or that a distance between two sampling point values is not zero but close. For example, the distance is less than or equal to a predefined threshold. The threshold may be preset, or may be determined according to dynamic of sampling point values of the first audio frame and/or the second audio frame. For example, the threshold may be obtained by multiplying an average value of the sampling point values of the first audio frame and/or the second audio frame by a preset percentage.

In an embodiment, the terminal may calculate a distance of each sampling point value pair of the first audio frame and the second audio frame, to select a sampling point value pair having the smallest distance. The frame segmentation position is a position corresponding to the selected sampling point value pair having the smallest distance. In this case, the closeness condition is that a distance of the sampling point value pair corresponding to the frame segmentation position in the first audio frame and the second audio frame is the smallest. The sampling point value pair herein refers to two sampling point values at same positions in the two audio frames. The positions of the sampling point values are positions of the sampling point values relative to the audio frames to which the sampling point values belong.

Figure 4:
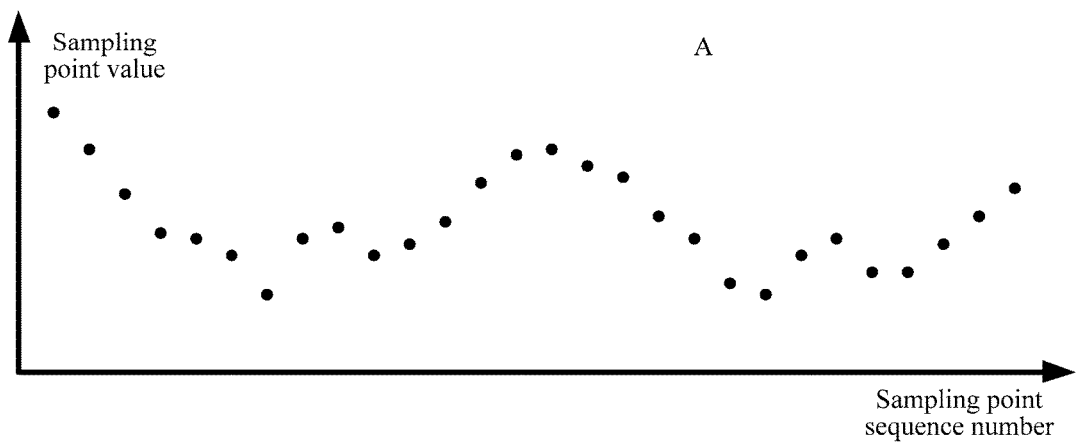
FIG. 4 is a partial distribution diagram of sampling point values of a first audio frame according to an embodiment.
Figure 5:
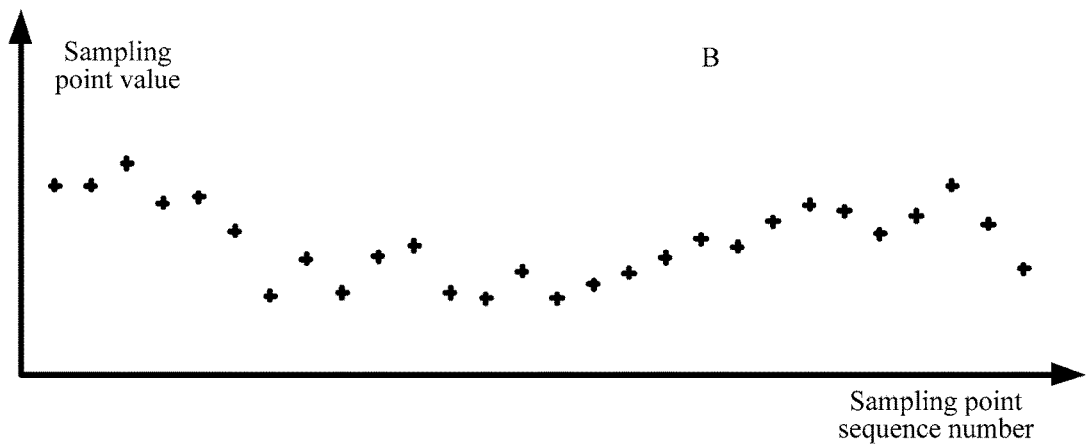
FIG. 5 is a partial distribution diagram of sampling point values of a second audio frame according to an embodiment.
Figure 6:
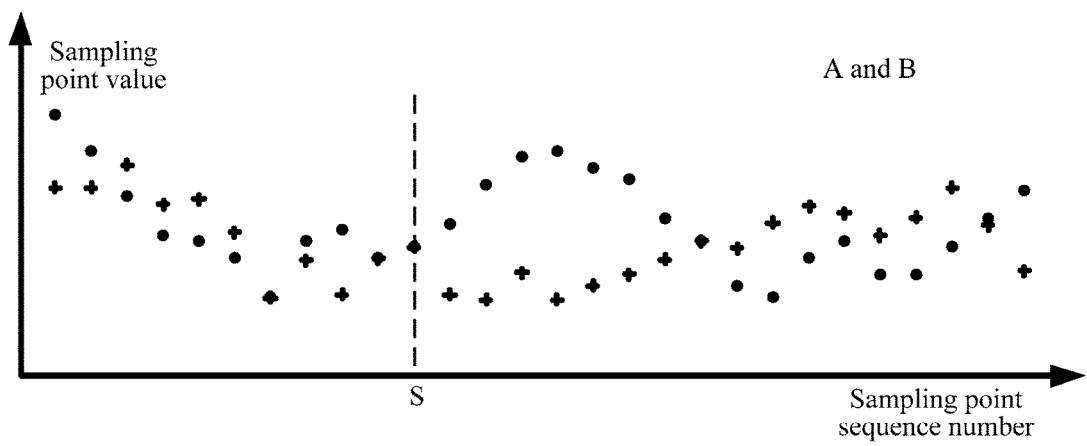
FIG. 6 is a partial distribution diagram of sampling point values obtained by overlapping a first audio frame and a second audio frame according to an embodiment.

For example, a partial distribution diagram shown in FIG. 6 of sampling point values is obtained by overlapping FIG. 4 and FIG. 5, so that it is convenient to compare the partial distribution of sampling point values of the audio frame A with the partial distribution of sampling point values of the audio frame B. Assuming that the frame segmentation position is S, an absolute value of a difference between a sampling point value at S of the audio frame A and a sampling point value at S of the audio frame B is close to zero (as the sampling point values of the two audio frames at position S are very near and even equal). That is, the distance between the sampling point value at S in the audio frame A and the sampling point value at S in the audio frame B satisfies the predefined closeness condition.

Step 206: (in the scenario for inserting an audio frame) Obtain all sampling point values preceding the frame segmentation position in the second audio frame and obtain all sampling point values following the frame segmentation position in the first audio frame, and sequentially stitch the sampling point values obtained from the second audio frame and the sampling point values obtained from the first audio frame, to generate a third audio frame; and insert the third audio frame between the first audio frame and the second audio frame; or (in the scenario for deleting an audio frame) obtain all sampling point values preceding the frame segmentation position in the first audio frame and obtain sampling point values following the frame segmentation position in the second audio frame, and sequentially stitch the sampling point values obtained from the first audio frame and the sampling point values obtained from the second audio frame, to generate a fourth audio frame; and replace the first audio frame and the second audio frame with the fourth audio frame in the audio data stream.

Specifically, when an audio frame needs to be inserted, sampling point values preceding the frame segmentation position in the second audio frame are obtained, and sampling point values following the frame segmentation position in the first audio frame are obtained. A quantity of the obtained sampling point values is right equal to a length of one audio frame. The sampling point values of the second audio frame and the sampling point values of the first audio frame are sequentially stitched, to generate a third audio frame. In addition, the sampling point values from the second audio frame are arranged according to a sequence in the second audio frame, and the sampling point values from the first audio frame are arranged according to a sequence in the first audio frame. Finally, the generated third audio frame is inserted between the first audio frame and the second audio frame.

Figure 7A:
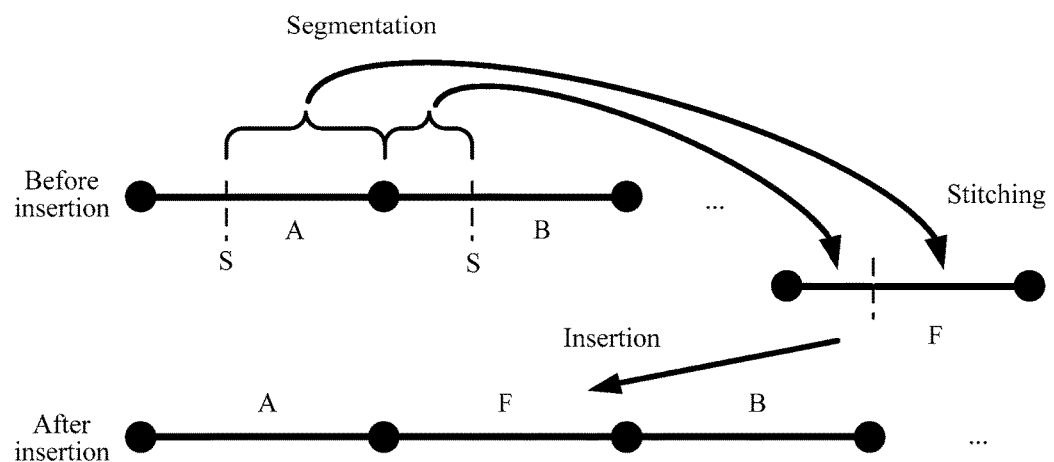
FIG. 7A is a schematic diagram of a process of segmenting an audio frame, stitching an audio frame and inserting an audio frame according to an embodiment.

For example, referring to FIG. 7A, the first audio frame A is segmented into a preceding part and a following part at the frame segmentation position S, and the second audio frame B is also segmented into a preceding part and a following part at the frame segmentation position S. The preceding part refers to sampling point values preceding the frame segmentation position S. Correspondingly, the following part refers to sampling point values following the frame segmentation position S. The preceding part of the second audio frame B and the following part of the first audio frame A are stitched in sequence, as shown in FIG. 7A, to obtain a third audio frame F, and then the third audio frame F obtained by stitching may be inserted between the first audio frame A and the second audio frame B. As shown in FIG. 7A, the preceding part of the second audio frame B becomes the preceding part of the third audio frame F, while the following part of the first audio frame A becomes the following part of the third audio frame F. Thus, when the audio frame F is inserted between audio frame A and audio frame B, there is no abrupt discontinuity created, and thereby avoiding the audible transitional noise generated by the audio output device as a result of the insertion of the audio frame F.

When an audio frame needs to be deleted, sampling point values preceding the frame segmentation position in the first audio frame are obtained, and sampling point values following the frame segmentation position in the second audio frame are obtained. A quantity of the obtained sampling point values is right equal to a length of one audio frame. The sampling point values of the first audio frame and the sampling point values of the second audio frame that have been obtained are sequentially stitched, to obtain a fourth audio frame. In addition, the sampling point values from the first audio frame are arranged according to a sequence in the first audio frame, and the sampling point values from the second audio frame are arranged according to a sequence in the second audio frame. Finally, the first audio frame and the second audio frame are replaced with the generated fourth audio frame.

Figure 7B:
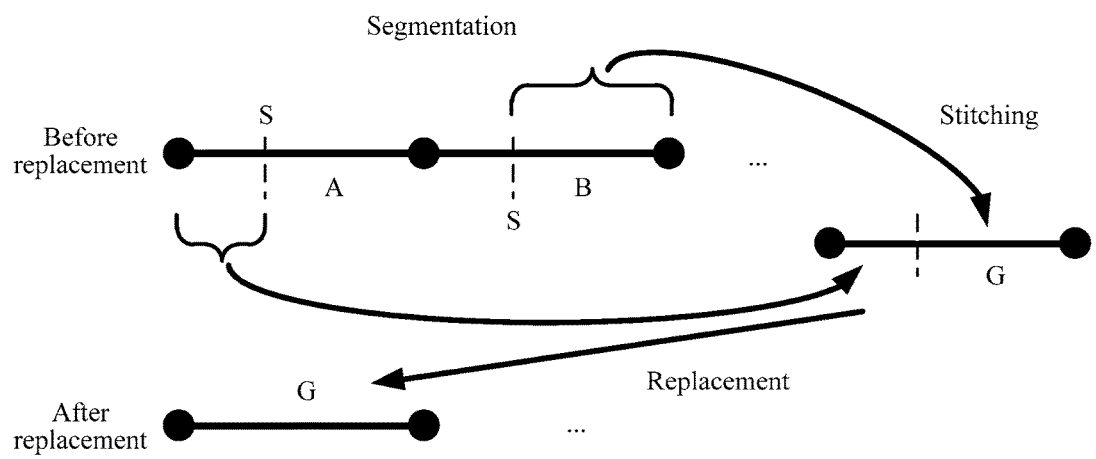
FIG. 7B is a schematic diagram of a process of segmenting an audio frame, stitching an audio frame and replacing an audio frame according to an embodiment.

For example, referring to FIG. 7B, a first audio frame A is segmented into a preceding part and a following part by the frame segmentation position S, and a second audio frame B is also segmented into a preceding part and a following part by the frame segmentation position S. The preceding part refers to sampling point values preceding the frame segmentation position S. Correspondingly, the following part refers to sampling point values following the frame segmentation position S. The preceding part of the first audio frame A and the following part of the second audio frame B are stitched in sequence, to obtain a fourth audio frame G, and then the first audio frame A and the second audio frame B may be replaced with the fourth audio frame G obtained by stitching. As shown in FIG. 7B, the preceding part of audio frame A becomes the preceding part of the audio frame G, and the following part of audio frame B becomes the following part of the audio frame G. Thus, when the audio frame G replaces audio frames A and B, there is no abrupt discontinuity created, and thereby avoiding the audible transitional noise generated by the audio output device as a result of the deletion of an entire audio frame.

In the foregoing audio data processing method, when an audio frame needs to be inserted, a part preceding a frame segmentation position in a second audio frame and a part following the frame segmentation position in a first audio frame are stitched, to obtain a third audio frame, and the third audio frame is inserted between the first audio frame and the second audio frame. After the insertion, a preceding part of the third audio frame is the preceding part of the second audio frame, and a following part of the third audio frame is the following part of the first audio frame. Because the first audio frame and the second audio frame are seamlessly stitched, the preceding part of the third audio frame and the first audio frame may be seamlessly stitched, and the following part of the third audio frame and the second audio frame may be seamlessly stitched. In addition, because the third audio frame satisfies a closeness condition at the frame segmentation position, an excessively great and sudden change does not occur at the stitched area. In this way, noise caused by skipping between audio frames when an audio frame is inserted is substantially overcome.

When an audio frame needs to be deleted, a part preceding the frame segmentation position in the first audio frame and a part following the frame segmentation position in the second audio frame are stitched, to obtain a fourth audio frame, and the first audio frame and the second audio frame are replaced with the fourth audio frame. After the replacement, a preceding part of the fourth audio frame is the preceding part of the first audio frame, and a following part of the fourth audio frame is the following part of the second audio frame. Because the first audio frame and a preceding audio frame are seamlessly stitched, and the second audio frame and a following audio frame are seamlessly stitched, the fourth audio frame and the preceding part of the first audio frame may be seamlessly stitched, and the fourth audio frame and the following audio frame of the second audio frame may be seamlessly stitched after the replacement. In addition, because the fourth audio frame satisfies a closeness condition at the frame segmentation position, an excessively great and sudden change does not occur at the stitched area. In this way, noise caused by skipping between audio frames when an audio frame is inserted is substantially overcome.

In an embodiment, the audio data processing method further includes: when performing real-time play processing on the audio data stream, reserving copies of sampling point values with a length of at least one audio frame. In addition, step 202 includes: when an instruction for inserting an audio frame is detected, obtaining, as the first audio frame, a reserved copy of sampling point values with a length of one audio frame on which play processing was performed before a sampling point value on which play processing is currently being performed, and obtaining, as the second audio frame, sampling point values with a length of one audio frame following the sampling point value on which play processing is currently being performed.

Figure 8:
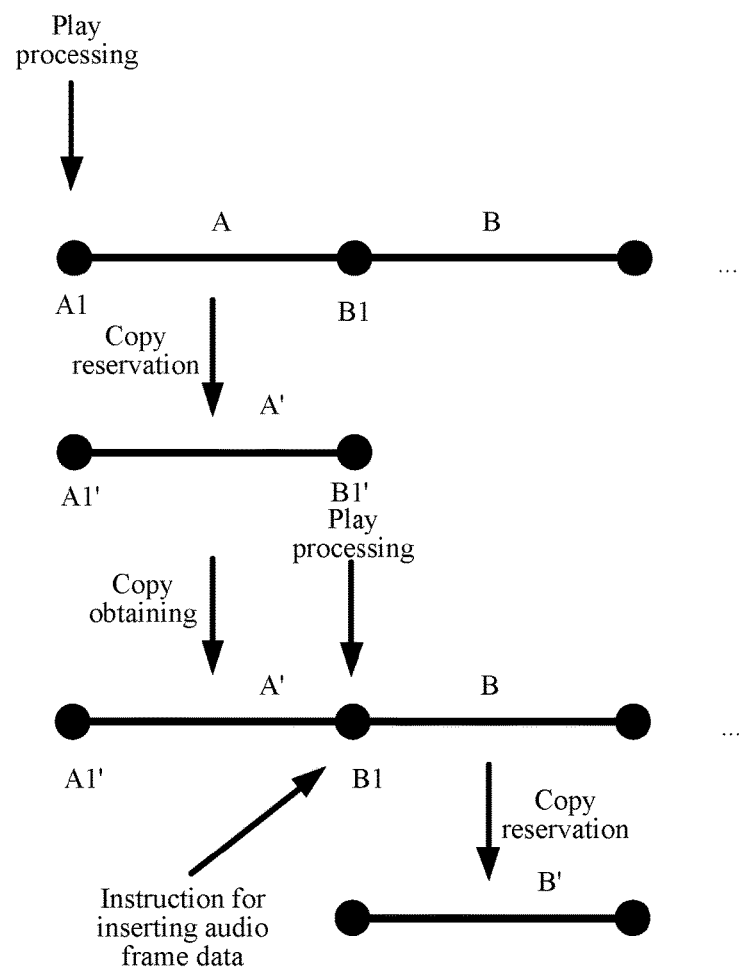
FIG. 8 is a schematic diagram of a process of reserving a copy and performing play processing according to an embodiment.

Play processing refers to that a sound signal is restored according to sampling point values (e.g., during playback of the audio data stream). Reserving copies of sampling point values with a length of at least one audio frame refers to reserve a copy of at least one audio frame. Specifically, referring to FIG. 8, when the terminal performs play processing on a sampling point value A1, the terminal reserves a copy A1' of the sampling point value A1. A copy of a sampling point value on which play processing was performed before the sampling point value A1 is also reserved. A total length of the reserved copies is a length of at least one audio frame.

The terminal is performing play processing on a sampling point value B1 after a length of one audio frame, and a copy B1' of the sampling point value B1 is also reserved. In this case, the reserved copies include at least a copy A' of the audio frame A. Assuming that the terminal detects an instruction for inserting an audio frame, the terminal uses copies of sampling point values with a length of one audio frame from the sampling point value A1 to the sampling point value B1 on which play processing was performed as the first audio frame A, and uses an audio frame B with a length of one audio frame and following the sampling point value B1 as the second audio frame.

In this embodiment, by reserving a copy of at least one audio frame when real-time play processing is performed on an audio data stream, a terminal may immediately respond to an instruction for inserting an audio frame when detecting the instruction, without waiting for a time length of one audio frame, thereby improving efficiency of inserting an audio frame.

Figure 9:
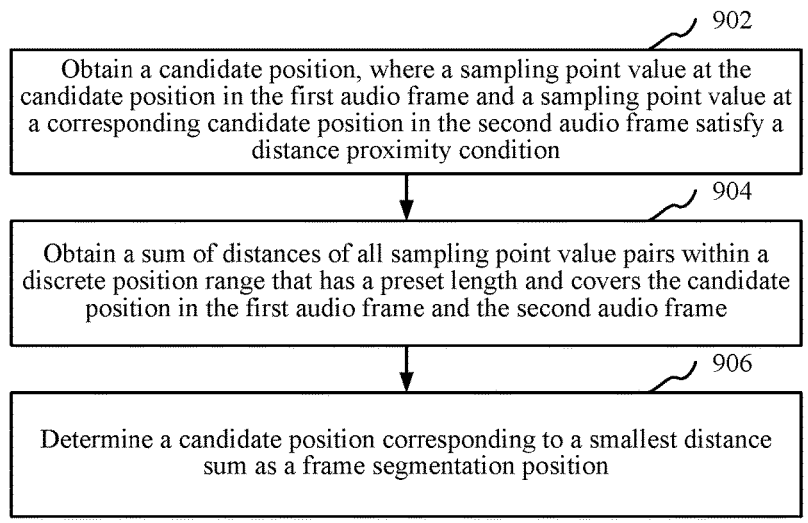
FIG. 9 is a schematic flowchart of steps of determining a frame segmentation position according to an embodiment.

As shown in FIG. 9, in an embodiment, step 204 specifically includes the following steps:

Step 902: Obtain a candidate position (e.g., a respective one of a plurality of candidate positions that have been obtained), where a sampling point value at the candidate position in the first audio frame and a sampling point value at a corresponding candidate position in the second audio frame satisfies the predefined closeness condition.

A candidate position is a selected position in an audio frame that may be used as a frame segmentation position. Specifically, the terminal may traverse all positions in an audio frame, and determine, each time a position is traversed, whether a sampling point value pair at corresponding positions in the first audio frame and the second audio frame satisfies a closeness condition. If the sampling point value pair satisfies the closeness condition, the position traversed is added to a candidate position set, and the traversal is continued. If the sampling point value pair does not satisfy the closeness condition, the position is not added to the candidate positions set and the traversal is continued. If the candidate position set is still empty after the traversal of all sampling positions along an audio frame, a preset position (such as a middle position in an audio frame) or a position of a sampling point value pair with a smallest distance may be selected and added to the candidate position set.

The closeness condition is a quantitative condition used for determining whether a distance between two sampling point values is sufficiently small. In an embodiment, the closeness condition may be that a distance is equal to 0, or that a distance between two sampling point values is not zero but close. For example, the distance is less than or equal to a threshold. The threshold may be preset, or may be determined according to dynamic of sampling point values of the first audio frame and/or the second audio frame.

In an embodiment, the terminal may calculate a distance of each sampling point value pair in the first audio frame and the second audio frame and rank the distances in ascending order. Then, the terminal may add positions corresponding to a preset quantity of distances that are ranked at front to the candidate position set, or may add positions corresponding to distances that occupy a preset percentage of all calculated distances and that are obtained starting from a smallest distance. In this case, the closeness condition is that distances of sampling point value pairs corresponding to candidate positions in the first audio frame and the second audio frame are a preset quantity of distances that are ranked at front of all calculated distances that are ranked in ascending order, or are distances that are ranked at front of all calculated distances ranked in ascending order and that occupy a preset percentage of the calculated distances.

In an embodiment, the closeness condition includes: A first requirement that a product of a first predefined difference and a second predefined difference is less than or equal to 0. The first difference is predefined as a difference between the sampling point value at the candidate position in the first audio frame and the sampling point value at the corresponding candidate position in the second audio frame. The second difference is predefined as a difference between a sampling point value at a position following the candidate position in the first audio frame and a sampling point value at a corresponding position in the second audio frame.

Specifically, assuming that a first audio frame A is $[a_1, a_2, \ldots, a_m]$, and a second audio frame B is $[b_1, b_2, \ldots, b_m]$, where $a_i$ represents the sampling point value of the audio frame A and $b_i$ represents the sampling point values of audio frame B, a closeness condition may be expressed by using the following formula (1):

$$(a_i - b_i) * (a_{i+1} - b_{i+1}) \leq 0, (i \in [1, m-1]) \quad \text{formula (1)}$$

where i represents a candidate position in the first audio frame A and the second audio frame B, and may be referred to as a sampling point sequence number, and m is a length of one audio frame; $(a_i - b_i)$ is a first difference, which represents a difference between a sampling point value $a_i$ at the candidate position i in the first audio frame A and a sampling point value $b_i$ at a corresponding candidate position i in the second audio frame B; $(a_{i+1} - b_{i+1})$ is a second difference, which represents a difference between a sampling point value $a_{i+1}$ at a position i+1 following the candidate position i in the first audio frame A and a sampling point value $b_{i+1}$ at a corresponding position i+1 in the second audio frame B; and formula (1) represents that a product of the first difference $(a_i - b_i)$ and the second difference $(a_{i+1} - b_{i+1})$ is less than or equal to 0.

Figure 10:
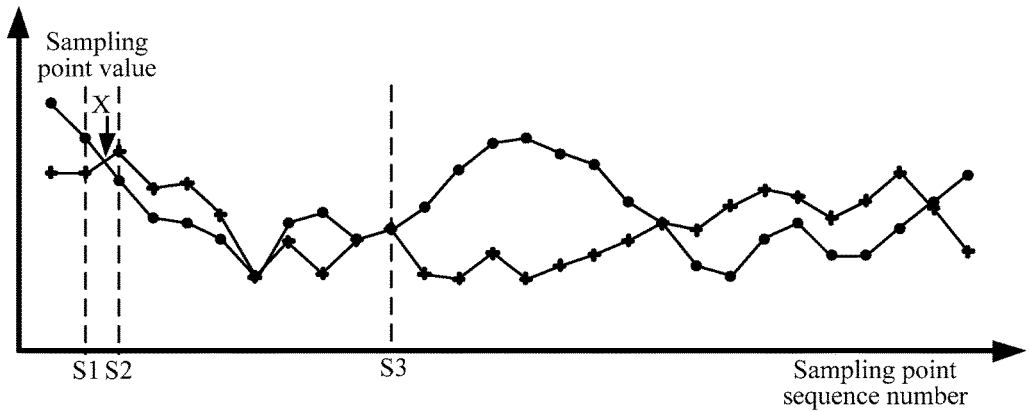
FIG. 10 is a schematic diagram showing that a first fitted curve of a first audio frame and a second fitted curve of a second audio frame are in a same coordinate system according to an embodiment.

The closeness condition expressed in formula (1) is used for finding an intersection of a first fitted curve constituted by sampling point values of the first audio frame and a second fitted curve constituted by sampling point values of the second audio frame. Alternatively, the intersection of the two curves may be determined in another manner. If the intersection is right at a position of a sampling point value, the position is added to the candidate position set. If the intersection is not at a position of any sampling point value, a position nearest to the intersection among all positions in the audio frames may be added to the candidate position set. For example, an intersection X is formed by the first fitted curve and the second fitted curve in FIG. 10, so that a position S1 or S2 nearest to the intersection X may be added to the candidate position set. There is another manner in which the intersection of the two curves is determined. For example, algebraic expressions of the two fitted curves are respectively obtained first, and then the intersection is directly determined by means of function computation. The closeness condition expressed in formula (1) is more efficient (in terms of speed and computations needed) for determining an intersection.

Step 904: Obtain a sum of distances of all sampling point value pairs within a discrete position range that has a preset length and covers the candidate position (e.g., a respective one of a plurality of candidate positions that have been identified) in the first audio frame and the second audio frame.

The discrete position range that has a preset length and covers the candidate position includes a respective candidate position that is being evaluated, and the discrete position set includes a specific quantity of discrete positions, that is, the discrete position set has a preset length. Preferentially, specific and equal quantities of discrete positions may be selected preceding and following the candidate position, to constitute the discrete position range together with the candidate position. Alternatively, discrete positions with different quantities may be selected preceding and following the candidate position, to constitute the discrete position range together with the candidate position. All positions in the discrete position set may be preferentially adjacent to each other in sequence. Alternatively and apparently, discrete positions may be selected at intervals, to constitute the discrete position range together with the candidate position.

Specifically, the terminal may select candidate positions one by one from the candidate position set, and obtain a sum of distances of all sampling point value pairs within the discrete position range that has a preset length and covers the selected candidate positions in the first audio frame and the second audio frame.

In an embodiment, the sum of distances of all sampling point value pairs within a discrete position range that has a preset length and covers the candidate positions in the first audio frame and the second audio frame may be obtained by using the following formula (2):

$$R_n = \sum_{j=n}^{2N+n} |a_j - b_j| \quad \text{formula (2)}$$

where n is obtained by subtracting N from the candidate position, and N may be selected from [1, (m−1)/2], may be preferentially selected from [2, (m−1)/100], and may be best to be 5. The candidate position is n+N, and the discrete position range is a discrete position range [n, . . . n+N, . . . , 2N+n] that has a length of 2N+1 and that is constituted by the candidate position n+N together with N positions selected leftward and rightward from the candidate position n+N. $|a_j-b_j|$ is a distance of each sampling point value pair ($a_j$, $b_j$) within the discrete position range in the first audio frame A and the second audio frame B. $R_n$ is a sum of distances of all sampling point value pairs ($a_j$, $b_j$) within the discrete position range in the first audio frame A and the second audio frame B.

Step 906: Determine a candidate position corresponding to a smallest distance sum as a frame segmentation position.

Specifically, to select a best candidate position from the candidate position set as the frame segmentation position, distance sums of all candidate positions in the candidate position set may be respectively calculated first, and then a candidate position corresponding to a smallest distance sum may be selected as the frame segmentation position. This may be specifically expressed by using the following formula (3):

$$T + \text{Min}(R_n)$$

where T is a target function. By optimizing the target function T and obtaining the candidate position n that corresponds to the smallest distance sum, the frame segmentation position n+N is obtained. The determined frame segmentation position also satisfies the closeness condition: A product of a first difference and a second difference is less than or equal to 0. The first difference is a difference between a sampling point value at a frame segmentation position in the first audio frame and a sampling point value at a corresponding frame segmentation position in the second audio frame. The second difference is a difference between a sampling point value at a position following the frame segmentation position in the first audio frame and a sampling point value at a corresponding position in the second audio frame.

In step 904 to step 906, a frame segmentation position is a candidate position found nearest to an intersection of the first fitted curve and the second fitted curve. Step 904 is a specific step of obtaining a local similarity of the first audio frame and the second audio frame at the corresponding candidate position, and step 906 is a specific step of determining a frame segmentation position according to the local similarity. The local similarity at the candidate position refers to a degree to which the first fitted curve is similar to the second fitted curve within a specific range near the candidate position. A smaller local similarity calculated by using formula (2) indicates a higher degree of similarity. The more similar the first fitted curve is to the second fitted curve near the candidate position, the more similar the slopes of the two curves are, and the more steadily the third audio frame obtained by segmentation and stitching transitions, so that noise is better suppressed.

The local similarity may further be obtained by calculating cross-correlation by using cross-correlation functions. Assuming that there are two functions f(t) and g(t), the cross-correlation function is defined as R(u)=f(t)*g(−t) and reflects a matching degree between the two functions at different relative positions. The cross-correlation functions may further represent similarity between two signals. When applied to this solution for calculating cross-correlation on a few points, two independent and co-directional sampling point values may have a relatively great cross-correlation, which indicates a greater similarity between the two curves. However, the determined position is not the best frame segmentation position. The disadvantage of calculating cross-correlation by using the cross-correlation functions is overcome by the local similarity obtained by using formula (2). Sampling point values at all positions play relatively the same roles in calculating cross-correlation by using formula (2). In addition, by using an absolute value of a difference as a functioning value measuring the help a sampling point value at a position brings, a difference between slopes preceding and following an intersection may be well described, and a most suitable candidate position may be found as a frame segmentation position.

In an embodiment, the first audio frame and the second audio frame adjacent to each other are obtained from the audio data stream of a designated channel when a sound effect is turned on. After performing steps of obtaining sampling point values preceding a frame segmentation position in the second audio frame and sampling point values following the frame segmentation position in the first audio frame and sequentially stitching the sampling point values, to generate a third audio frame, and inserting the third audio frame between the first audio frame and the second audio frame, the terminal performs fade-in processing on the inserted third audio frame, so that the inserted third audio frame gradually transitions from a no-sound effect state to an intact-sound effect state according to a time sequence.

Specifically, step 202, step 204 and the first half of step 206, that is, inserting an audio frame, are performed on the audio data stream of the designated channel. An instruction for turning on a sound effect is the instruction for inserting an audio frame. The turned-on sound effect is a sound effect based on channel asynchronization, for example. By inserting one audio frame into the designated channel (e.g., a selected one of a pair of audio channels), the audio data stream of the designated channel is later than the remaining channels by one audio frame, so that one sound reaches ears of a person later than another sound by a time length of one audio frame, thereby generating a Surround sound effect.

The no-sound effect state is a state before a sound effect is turned on, and the intact-sound effect state is a state after a sound effect is turned on. By performing fade-in processing on the third audio frame, the inserted third audio frame gradually transitions from the no-sound effect state to the intact-sound effect state according to a time sequence of sampling point values in the third audio frame, thereby achieving gentle transition of a sound effect. For example, if volume in the intact-sound effect state needs to be increased by 5 multiples, a multiple of the volume may be gradually increased until the volume is increased by 5 multiples, so that the third audio frame may be seamlessly stitched with the second audio frame in the intact-sound effect state. The gradual transition may be a linear transition or a curved transition.

In this embodiment, when a sound effect is turned off, step 202, step 204 and the second half of step 206, that is, replacing an audio frame, may be performed on the audio data stream of the designated channel, and fade-out processing may be performed on the obtained fourth audio frame, so that the obtained fourth audio frame gradually transitions from an intact-sound effect state to a no-sound effect state according to a time sequence. The fade-out processing is opposite to the fade-in processing, and is a processing process of gradually removing impact of a sound effect.

In this embodiment, two audio frames of a designated channel are replaced with one audio frame, to delete one audio frame, so that the designated channel is restored to be synchronous with another channel. A sound effect based on channel asynchronization may be quickly turned on/turned off, thereby improving sound effect switching. In some embodiments, the sampling point value refers to one of a plurality of distinct audio properties (e.g., pitch, volume, etc.) of the sound that is output by the terminal. In some embodiments, the method described above is performed for each of the plurality of audio properties, and the inserted sound frame has values for the plurality of distinct audio properties that are determined based on the audio properties of the first audio frame and the second audio frame.

In an embodiment, for the first audio frame and the second audio frame adjacent to each other and obtained from the audio data stream of a designated channel when a sound effect is turned off, the following steps may be performed: obtaining sampling point values preceding a frame segmentation position in the first audio frame and sampling point values following the frame segmentation position in the second audio frame and sequentially stitching the sampling point values, to generate a fourth audio frame, and replacing the first audio frame and the second audio frame with the fourth audio frame, and performing fade-in processing on the obtained fourth audio frame, so that the obtained fourth audio frame gradually transitions from an intact-sound effect to a no-sound effect state according to a time sequence.

In this embodiment, when a sound effect is turned off, step 202, step 204 and the first half of step 206 may be performed on a designated channel: obtaining sampling point values preceding a frame segmentation position in the second audio frame and sampling point values following the frame segmentation position in the first audio frame and sequentially stitching the sampling point values, to generate a third audio frame, inserting the third audio frame between the first audio frame and the second audio frame, and performing fade-out processing on the inserted third audio frame, so that the inserted third audio frame gradually transitions from an intact-sound effect state to a no-sound effect state according to a time sequence. According to this embodiment, a sound effect based on channel asynchronization may also be quickly turned on/turned off, thereby improving sound effect switching.

Figure 11:
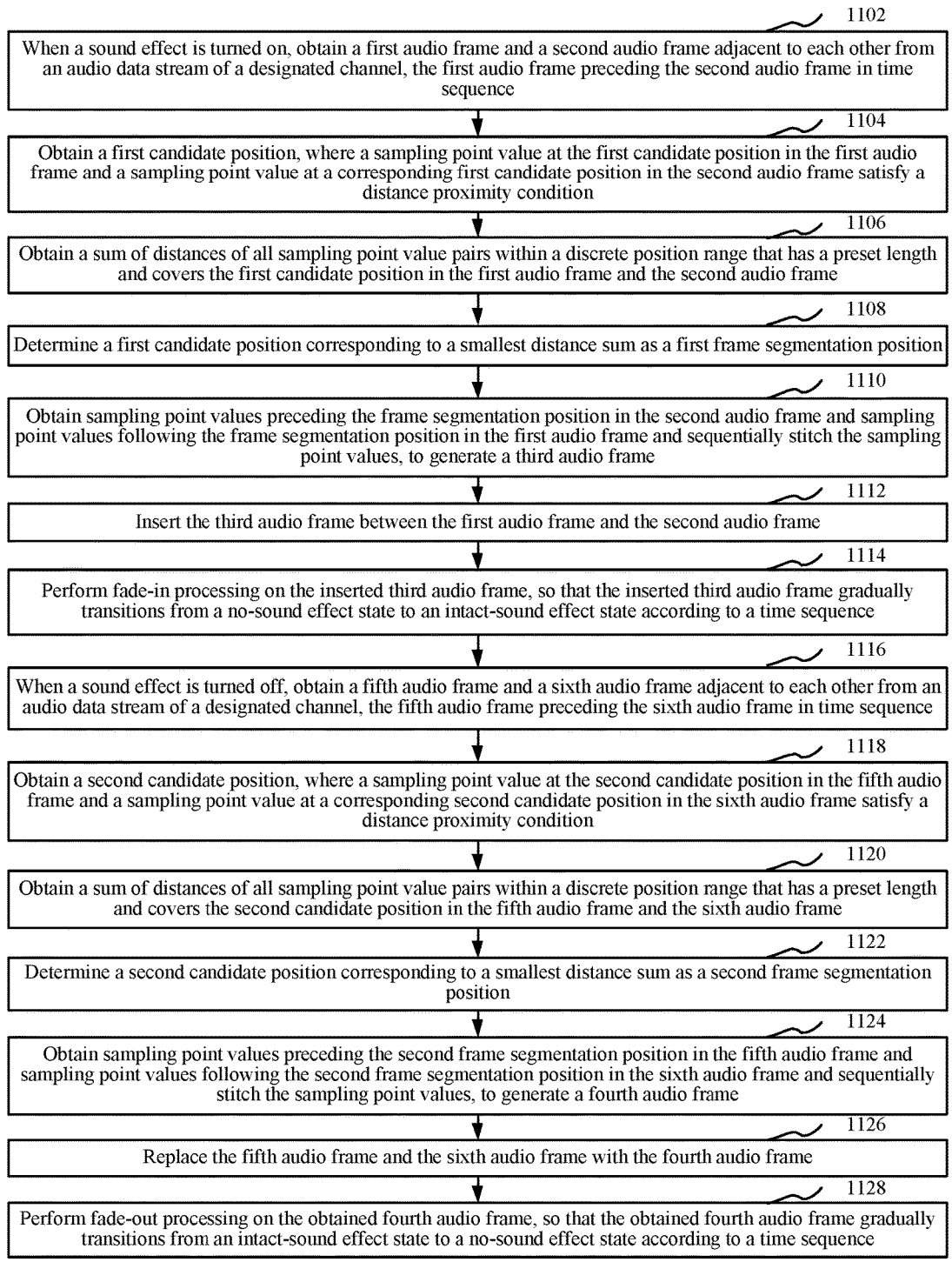
FIG. 11 is a schematic flowchart of an audio data processing method according to an embodiment.

As shown in FIG. 11, in an embodiment, an audio data processing method is provided, including the following steps:

Step 1102: When a sound effect is turned on, obtain a first audio frame and a second audio frame adjacent to each other from an audio data stream of a designated channel, the first audio frame preceding the second audio frame in time sequence.

Step 1104: Obtain a first candidate position, where a sampling point value at the first candidate position in the first audio frame and a sampling point value at a corresponding first candidate position in the second audio frame satisfy a closeness condition. The closeness condition may be: A product of a first difference and a second difference is less than or equal to 0. The first difference is a difference between the sampling point value at the candidate position in the first audio frame and the sampling point value at the corresponding candidate position in the second audio frame. The second difference is a difference between a sampling point value at a position following the candidate position in the first audio frame and a sampling point value at a corresponding position in the second audio frame.

Step 1106: Obtain a sum of distances of all sampling point value pairs within a discrete position range that has a preset length and covers the first candidate position in the first audio frame and the second audio frame.

Step 1108: Determine a first candidate position corresponding to a smallest distance sum as a first frame segmentation position.

Step 1110: Obtain sampling point values preceding the frame segmentation position in the second audio frame and sampling point values following the frame segmentation position in the first audio frame and sequentially stitch the sampling point values, to generate a third audio frame.

Step 1112: Insert the third audio frame between the first audio frame and the second audio frame.

Step 1114: Perform fade-in processing on the inserted third audio frame, so that the inserted third audio frame gradually transitions from a no-sound effect state to an intact-sound effect state according to a time sequence.

Step 1116: When a sound effect is turned off, obtain a fifth audio frame and a sixth audio frame adjacent to each other from an audio data stream of a designated channel, the fifth audio frame preceding the sixth audio frame in time sequence. The fifth audio frame is equivalent to the first audio frame in step 206 in the embodiment shown in FIG. 2 for generating the fourth audio frame, and the sixth audio frame is equivalent to the second audio frame in step 206 in the embodiment shown in FIG. 2 for generating the fourth audio frame.

Step 1118: Obtain a second candidate position, where a sampling point value at the second candidate position in the fifth audio frame and a sampling point value at a corresponding second candidate position in the sixth audio frame satisfy a closeness condition. The closeness condition may be: A product of a first difference and a second difference is less than or equal to 0. The first difference is a difference between a sampling point value at a candidate position in the fifth audio frame and a sampling point value at a corresponding candidate position in the sixth audio frame. The second difference is a difference between a sampling point value at a position following the candidate position in the fifth audio frame and a sampling point value at a corresponding position in the sixth audio frame.

Step 1120: Obtain a sum of distances of all sampling point value pairs within a discrete position range that has a preset length and covers the second candidate position in the fifth audio frame and the sixth audio frame.

Step 1122: Determine a second candidate position corresponding to a smallest distance sum as a second frame segmentation position.

Step 1124: Obtain sampling point values preceding the second frame segmentation position in the fifth audio frame and sampling point values following the second frame segmentation position in the sixth audio frame and sequentially stitch the sampling point values, to generate a fourth audio frame.

Step 1126: Replace the fifth audio frame and the sixth audio frame with the fourth audio frame.

Step 1128: Perform fade-out processing on the obtained fourth audio frame, so that the obtained fourth audio frame gradually transitions from an intact-sound effect state to a no-sound effect state according to a time sequence.

In the foregoing audio data processing method, when an audio frame needs to be inserted, a part preceding a frame segmentation position in a second audio frame and a part following the frame segmentation position in a first audio frame are stitched, to obtain a third audio frame, and the third audio frame is inserted between the first audio frame and the second audio frame. After the insertion, a preceding part of the third audio frame is the preceding part of the second audio frame, and a following part of the third audio frame is the following part of the first audio frame. Because the first audio frame and the second audio frame are seamlessly stitched, the preceding part of the third audio frame and the first audio frame may be seamlessly stitched, and the following part of the third audio frame and the second audio frame may be seamlessly stitched. In addition, because the third audio frame satisfies a closeness condition at the frame segmentation position, an excessively great and sudden change does not occur at the stitched area. In this way, noise caused by skipping between audio frames when an audio frame is inserted is substantially overcome.

When an audio frame needs to be deleted, a part preceding the frame segmentation position in the first audio frame and a part following the frame segmentation position in the second audio frame are stitched, to obtain a fourth audio frame, and the first audio frame and the second audio frame are replaced with the fourth audio frame. After the replacement, a preceding part of the fourth audio frame is the preceding part of the first audio frame, and a following part of the fourth audio frame is the following part of the second audio frame. Because the first audio frame and a preceding audio frame are seamlessly stitched, and the second audio frame and a following audio frame are seamlessly stitched, the fourth audio frame and the preceding part of the first audio frame may be seamlessly stitched, and the fourth audio frame and the following audio frame of the second audio frame may be seamlessly stitched after the replacement. In addition, because the fourth audio frame satisfies a closeness condition at the frame segmentation position, an excessively great and sudden change does not occur at the stitched area. In this way, noise caused by skipping between audio frames when an audio frame is inserted is substantially overcome.

This application further provides a terminal. An internal structure of the terminal may correspond to the structure shown in FIG. 1. Some or all of the following modules may be implemented by software, hardware or a combination thereof. A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments are performed. The storage medium may be a non-volatile storage medium such as a magnetic disk, an optical disc, or a read-only memory (ROM), a random access memory (RAM), or the like.

The technical features of the foregoing embodiments may be arbitrarily combined. For brevity, not all possible combinations of the technical features in the foregoing embodiments are described. However, these technical features should be considered as falling within the protection scope of this specification as long as no conflict occurs.

The described embodiments are merely some embodiments of this application, which are specifically and thoroughly described. However, it should not be understood as a limitation to the patent scope of the present disclosure. It should be noted that a person of ordinary skill in the art may further make some variations and improvements without departing from the concept of this application, and the variations and improvements shall fall within the protection scope of this application. Therefore, the protection scope of this application shall be subject to the protection scope of the appended claims.

What is claimed is:

1. An audio data processing method for removing transitional noise in an audio data stream, comprising:
   at an apparatus comprising one or more processors and memory:
   obtaining a first audio frame and a second audio frame adjacent to each other from the audio data stream, the first audio frame preceding the second audio frame in a time sequence of the audio data stream;
   determining a frame segmentation position in the first audio frame and the second audio frame in accordance with predefined closeness criteria, wherein the predefined closeness criteria require that a predefined distance between a respective sampling point value at the frame segmentation position in the first audio frame and a respective sampling point value at the frame segmentation position in the second audio frame satisfy a predefined closeness condition;
   obtaining respective sampling point values preceding the frame segmentation position in the second audio frame and respective sampling point values following the frame segmentation position in the first audio frame;
   sequentially stitching the respective sampling point values obtained from the second audio frame and the respective sampling point values obtained from the first audio frame, to generate a third audio frame; and
   inserting the third audio frame between the first audio frame and the second audio frame.

2. The method according to claim 1, further comprising: when performing real-time play processing on the audio data stream, reserving copies of sampling point values with a length of at least one audio frame, wherein:
   obtaining the first audio frame and the second audio frame adjacent to each other from the audio data stream comprises:
   when an instruction for inserting an audio frame is detected, obtaining, as the first audio frame, a reserved copy of sampling point values with a length of one audio frame on which play processing was performed before a sampling point value on which play processing is currently being performed, and obtaining, as the second audio frame, sampling point values with a length of one audio frame following the sampling point value on which play processing is currently being performed.

3. The method according to claim 1, wherein determining the frame segmentation position in the first audio frame and the second audio frame in accordance with the predefined closeness criteria comprises:
   obtaining a plurality of candidate positions, wherein, for each of the plurality of candidate positions, a distance between a sampling point value at the candidate position in the first audio frame and a sampling point value at the candidate position in the second audio frame satisfy the predefined closeness condition;
   for each of the plurality of candidate positions, obtaining a respective local similarity of the first audio frame and the second audio frame at the candidate position; and
   determining the frame segmentation position from among the plurality of candidate positions according to the respective local similarity obtained for each of the plurality of candidate positions.

4. The method according to claim 1, wherein determining the frame segmentation position in the first audio frame and the second audio frame in accordance with the predefined closeness criteria comprises:
  obtaining a plurality of candidate positions, wherein, for each of the plurality of candidate positions, a distance between a sampling point value at the candidate position in the first audio frame and a sampling point value at the candidate position in the second audio frame satisfy the predefined closeness condition;
  for each of the plurality of candidate positions, obtaining a respective sum of distances of all sampling point value pairs within a discrete position range that has a preset length and covers the candidate position in the first audio frame and the second audio frame; and
  determining, from among the plurality of candidate positions, a candidate position corresponding to a smallest distance sum as the frame segmentation position.

5. The method according to claim 4, wherein the predefined closeness condition includes:
  a first requirement that a product of a predefined first difference and a predefined second difference is less than or equal to 0, wherein:
    the first difference is predefined as a difference between the sampling point value at the candidate position in the first audio frame and the sampling point value at the candidate position in the second audio frame; and
    the second difference is predefined as a difference between a sampling point value at a position following the candidate position in the first audio frame and a sampling point value at a corresponding position in the second audio frame.

6. The method according to claim 1, wherein:
  the first audio frame and the second audio frame are obtained from the audio data stream of a designated channel when a sound effect is turned on, and
  the method includes performing fade-in processing on the inserted third audio frame, so that the inserted third audio frame gradually transitions from a no-sound effect state to an intact-sound effect state.

7. The method according to claim 6, including:
  obtaining a fifth audio frame and a sixth audio frame adjacent to each other from the audio data stream of the designated channel when the sound effect is turned off, the fifth audio frame preceding the sixth audio frame in the time sequence of the audio data stream;
  determining a second frame segmentation position in the fifth audio frame and the sixth audio frame in accordance with second predefined closeness criteria, wherein the second predefined closeness criteria require that a predefined distance between a respective sampling point value at the second frame segmentation position in the fifth audio frame and a respective sampling point value at the second frame segmentation position in the sixth audio frame satisfy a second predefined closeness condition;
  obtaining respective sampling point values preceding the second frame segmentation position in the fifth audio frame and respective sampling point values following the second frame segmentation position in the sixth audio frame;
  sequentially stitching the respective sampling point values obtained from the fifth audio frame and the respective sampling point values obtained from the sixth audio frame, to generate a fourth audio frame;
  replacing the fifth audio frame and the sixth audio frame with the fourth audio frame; and
  performing fade-out processing on the fourth audio frame, so that the fourth audio frame gradually transitions from the intact-sound effect state to the no-sound effect state.

8. An audio data processing apparatus, comprising:
one or more processors; and
memory including instructions, which when executed by the one or more processors, cause the processors to perform operations comprising:
  obtaining a first audio frame and a second audio frame adjacent to each other from the audio data stream, the first audio frame preceding the second audio frame in a time sequence of the audio data stream;
  determining a frame segmentation position in the first audio frame and the second audio frame in accordance with predefined closeness criteria, wherein the predefined closeness criteria require that a predefined distance between a respective sampling point value at the frame segmentation position in the first audio frame and a respective sampling point value at the frame segmentation position in the second audio frame satisfy a predefined closeness condition;
  obtaining respective sampling point values preceding the frame segmentation position in the second audio frame and respective sampling point values following the frame segmentation position in the first audio frame;
  sequentially stitching the respective sampling point values obtained from the second audio frame and the respective sampling point values obtained from the first audio frame, to generate a third audio frame; and
  inserting the third audio frame between the first audio frame and the second audio frame.

9. The audio data processing apparatus according to claim 8, wherein the operations further comprise:
  when performing real-time play processing on the audio data stream, reserving copies of sampling point values with a length of at least one audio frame, wherein:
  obtaining the first audio frame and the second audio frame adjacent to each other from the audio data stream comprises:
    when an instruction for inserting an audio frame is detected, obtaining, as the first audio frame, a reserved copy of sampling point values with a length of one audio frame on which play processing was performed before a sampling point value on which play processing is currently being performed, and obtaining, as the second audio frame, sampling point values with a length of one audio frame following the sampling point value on which play processing is currently being performed.

10. The audio data processing apparatus according to claim 8, wherein determining the frame segmentation position in the first audio frame and the second audio frame in accordance with the predefined closeness criteria comprises:
  obtaining a plurality of candidate positions, wherein, for each of the plurality of candidate positions, a distance between a sampling point value at the candidate position in the first audio frame and a sampling point value at the candidate position in the second audio frame satisfy the predefined closeness condition;
  for each of the plurality of candidate positions, obtaining a respective local similarity of the first audio frame and the second audio frame at the candidate position; and
  determining the frame segmentation position from among the plurality of candidate positions according to the respective local similarity obtained for each of the plurality of candidate positions.

11. The audio data processing apparatus according to claim 8, wherein determining the frame segmentation position in the first audio frame and the second audio frame in accordance with the predefined closeness criteria comprises:
obtaining a plurality of candidate positions, wherein, for each of the plurality of candidate positions, a distance between a sampling point value at the candidate position in the first audio frame and a sampling point value at the candidate position in the second audio frame satisfy the predefined closeness condition;
for each of the plurality of candidate positions, obtaining a respective sum of distances of all sampling point value pairs within a discrete position range that has a preset length and covers the candidate position in the first audio frame and the second audio frame; and
determining, from among the plurality of candidate positions, a candidate position corresponding to a smallest distance sum as the frame segmentation position.

12. The audio data processing apparatus according to claim 11, wherein the predefined closeness condition includes:
a first requirement that a product of a predefined first difference and a predefined second difference is less than or equal to 0, wherein:
the first difference is predefined as a difference between the sampling point value at the candidate position in the first audio frame and the sampling point value at the candidate position in the second audio frame; and
the second difference is predefined as a difference between a sampling point value at a position following the candidate position in the first audio frame and a sampling point value at a corresponding position in the second audio frame.

13. The audio data processing apparatus according to claim 8, wherein:
the first audio frame and the second audio frame are obtained from the audio data stream of a designated channel when a sound effect is turned on, and
the method includes performing fade-in processing on the inserted third audio frame, so that the inserted third audio frame gradually transitions from a no-sound effect state to an intact-sound effect state.

14. The audio data processing apparatus according to claim 13, wherein the operations further include:
obtaining a fifth audio frame and a sixth audio frame adjacent to each other from the audio data stream of the designated channel when the sound effect is turned off, the fifth audio frame preceding the sixth audio frame in the time sequence of the audio data stream;
determining a second frame segmentation position in the fifth audio frame and the sixth audio frame in accordance with second predefined closeness criteria, wherein the second predefined closeness criteria require that a predefined distance between a respective sampling point value at the second frame segmentation position in the fifth audio frame and a respective sampling point value at the second frame segmentation position in the sixth audio frame satisfy a second predefined closeness condition;
obtaining respective sampling point values preceding the second frame segmentation position in the fifth audio frame and respective sampling point values following the second frame segmentation position in the sixth audio frame;
sequentially stitching the respective sampling point values obtained from the fifth audio frame and the respective sampling point values obtained from the sixth audio frame, to generate a fourth audio frame;
replacing the fifth audio frame and the sixth audio frame with the fourth audio frame; and
performing fade-out processing on the fourth audio frame, so that the fourth audio frame gradually transitions from the intact-sound effect state to the no-sound effect state.

15. A non-transitory computer-readable storage medium storing instructions, the instructions, when executed by the one or more processors, cause one or more processors to perform operations comprising:
obtaining a first audio frame and a second audio frame adjacent to each other from the audio data stream, the first audio frame preceding the second audio frame in a time sequence of the audio data stream;
determining a frame segmentation position in the first audio frame and the second audio frame in accordance with predefined closeness criteria, wherein the predefined closeness criteria require that a predefined distance between a respective sampling point value at the frame segmentation position in the first audio frame and a respective sampling point value at the frame segmentation position in the second audio frame satisfy a predefined closeness condition;
obtaining respective sampling point values preceding the frame segmentation position in the second audio frame and respective sampling point values following the frame segmentation position in the first audio frame;
sequentially stitching the respective sampling point values obtained from the second audio frame and the respective sampling point values obtained from the first audio frame, to generate a third audio frame; and
inserting the third audio frame between the first audio frame and the second audio frame.

16. The computer-readable storage medium according to claim 15, wherein the operations further comprise:
when performing real-time play processing on the audio data stream, reserving copies of sampling point values with a length of at least one audio frame, wherein:
obtaining the first audio frame and the second audio frame adjacent to each other from the audio data stream comprises:
when an instruction for inserting an audio frame is detected, obtaining, as the first audio frame, a reserved copy of sampling point values with a length of one audio frame on which play processing was performed before a sampling point value on which play processing is currently being performed, and obtaining, as the second audio frame, sampling point values with a length of one audio frame following the sampling point value on which play processing is currently being performed.

17. The computer-readable storage medium according to claim 15, wherein determining the frame segmentation position in the first audio frame and the second audio frame in accordance with the predefined closeness criteria comprises:
obtaining a plurality of candidate positions, wherein, for each of the plurality of candidate positions, a distance between a sampling point value at the candidate position in the first audio frame and a sampling point value at the candidate position in the second audio frame satisfy the predefined closeness condition;

for each of the plurality of candidate positions, obtaining a respective local similarity of the first audio frame and the second audio frame at the candidate position; and determining the frame segmentation position from among the plurality of candidate positions according to the respective local similarity obtained for each of the plurality of candidate positions.

18. The computer-readable storage medium according to claim 15, wherein determining the frame segmentation position in the first audio frame and the second audio frame in accordance with the predefined closeness criteria comprises:

obtaining a plurality of candidate positions, wherein, for each of the plurality of candidate positions, a distance between a sampling point value at the candidate position in the first audio frame and a sampling point value at the candidate position in the second audio frame satisfy the predefined closeness condition;

for each of the plurality of candidate positions, obtaining a respective sum of distances of all sampling point value pairs within a discrete position range that has a preset length and covers the candidate position in the first audio frame and the second audio frame; and determining, from among the plurality of candidate positions, a candidate position corresponding to a smallest distance sum as the frame segmentation position.

19. The computer-readable storage medium according to claim 18, wherein the predefined closeness condition includes:

a first requirement that a product of a predefined first difference and a predefined second difference is less than or equal to 0, wherein:

the first difference is predefined as a difference between the sampling point value at the candidate position in the first audio frame and the sampling point value at the candidate position in the second audio frame; and the second difference is predefined as a difference between a sampling point value at a position following the candidate position in the first audio frame and a sampling point value at a corresponding position in the second audio frame.

20. The computer-readable storage medium according to claim 15, wherein:

the first audio frame and the second audio frame are obtained from the audio data stream of a designated channel when a sound effect is turned on, and the method includes performing fade-in processing on the inserted third audio frame, so that the inserted third audio frame gradually transitions from a no-sound effect state to an intact-sound effect state.

* * * * *